(12) United States Patent
Aoto (10) Patent No.: US 7,459,228 B2
(45) Date of Patent: Dec. 2, 2008

(54) SEPARATOR FOR FUEL CELL INCLUDING A TERMINAL OF A CELL VOLTAGE MONITOR

(75) Inventor: Akira Aoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 168 days.

(21) Appl. No.: 10/629,764

(22) Filed: Jul. 30, 2003

(65) Prior Publication Data

US 2004/0028969 A1 Feb. 12, 2004

(30) Foreign Application Priority Data

Aug. 9, 2002 (JP) .............................. 2002-233621

(51) Int. Cl.
*H01M 8/02* (2006.01)
*H01M 8/04* (2006.01)
(52) U.S. Cl. .......................................... 429/34; 429/22
(58) Field of Classification Search .................... 429/34, 429/22
See application file for complete search history.

(56) References Cited

U.S. PATENT DOCUMENTS

| | | | |
|---|---|---|---|
| 5,858,569 A * | 1/1999 | Meacher et al. ................ 429/26 |
| 6,291,094 B1 * | 9/2001 | Yoshimura et al. ............. 429/34 |
| 6,440,598 B1 * | 8/2002 | Fukui et al. .................... 429/34 |
| 6,724,194 B1 * | 4/2004 | Barton ........................ 324/432 |
| 2002/0177019 A1 * | 11/2002 | Aoto et al. ..................... 429/22 |

FOREIGN PATENT DOCUMENTS

| | | |
|---|---|---|
| CA | 2329674 | 6/2001 |
| JP | 10228914 A | 8/1998 |
| JP | 11-339828 A | 12/1999 |
| JP | 11354142 | 12/1999 |
| JP | 2001256992 A | 9/2001 |
| JP | 2001-283880 A | 10/2001 |
| JP | 2002-184434 | 6/2002 |

* cited by examiner

*Primary Examiner*—Mark Ruthkosky
(74) *Attorney, Agent, or Firm*—Kenyon & Kenyon LLP

(57) ABSTRACT

A separator for a fuel cell includes a metal plate that is formed of a gas passage portion and a contact portion of a part other than the gas passage portion. The contact portion is brought into contact with a terminal of a cell voltage monitor attached to the fuel cell. The surface treatment applied to the gas passage portion is different from the surface treatment applied to the contact portion. The surface treatment applied to the gas passage portion includes a carbon coat, and the surface treatment applied to the contact portion includes no carbon coat.

9 Claims, 7 Drawing Sheets

FIG. 8 ary, to a metal
SEPARATOR FOR FUEL CELL INCLUDING A TERMINAL OF A CELL VOLTAGE MONITOR

INCORPORATION BY REFERENCE

The disclosure of Japanese Patent Application No.2002-233621 filed on Aug. 9, 2002, including the specification, drawings and abstract are incorporated herein by reference in its entirety.

BACKGROUND OF THE INVENTION

1. Field of Invention

The invention relates to a separator for a low temperature type fuel cell, especially, a polymer electrolyte fuel cell (hereinafter referred to as PEFC), and more particularly, to a metal plate of the separator, to which different types of surface treatment is applied.

2. Description of Related Art

The PEFC is formed by stacking an MEA (Membrane-Electrode Assembly) and separators. The MEA includes an electrode or anode (fuel electrode) formed of an electrolyte membrane as an ion-exchange membrane and a catalytic layer formed on one surface of the electrolyte membrane, and an electrode or cathode (air electrode) formed of the electrolyte membrane as the ion-exchange membrane and a catalytic layer formed on the other surface of the electrolyte membrane. Diffusion layers are provided between the MEA and the separators at the anode side and the cathode side, respectively. The separator has a fuel gas passage for supplying the fuel gas (hydrogen) to the anode, and has an oxide gas passage for supplying oxide gas to the cathode. The separator also has a refrigerant passage through which a refrigerant or cooling water is supplied. A unit cell is formed by interposing the MEA between the separators. At least one unit cell is used to form a module, and a plurality of modules are further stacked into a fuel cell stack. Terminals, insulators and end plates are provided at both sides of the fuel cell stack in the stack direction such that the cells are tightened in the stack direction so as to be fixed with fastening members, for example, a tension plate that is disposed outside the fuel cell stack and extends in the stack direction, and bolt/nut into the fuel cell stack structure. At the anode side of each cell, a reaction occurs for decomposing hydrogen into a hydrogen ion (proton) and an electron. The resultant hydrogen ion moves toward the cathode side through the electrolyte membrane. At the cathode side of each cell, the hydrogen ion and the electron (generated in the anode of the adjacent MEA through the separator, or generated in the anode of the cell at one end in the stack direction moving to the cathode of the cell at the other end through the outer circuit) are reacted to generate water as follows:

anode: $H_2 \rightarrow 2H^+ + 2e^-$ cathode: $2H^+ + 2e^- + (\frac{1}{2})O_2 \rightarrow H_2O$.

The cell voltage by each cell or a group of cells is monitored so as to make sure if power is normally generated in the cell, to control the flow rate of reaction gas, and to guide the motor in case of abnormal voltage. For example, JP-A-11-389828 discloses a cell voltage monitor for the fuel cell. JP-A-2001-283880 discloses application of carbon coat to a whole surface of the metal separator so as to improve the corrosion resistance of the gas passage portion thereof.

If the carbon coat is applied to a contact portion of the metal separator, which is brought into contact with a terminal of a cell voltage monitor, the contact resistance of such contact portion becomes unstable. As a result, the accuracy in detecting the voltage generated in the cell is degraded. If the carbon coat is not applied to the metal separator, the corrosion in the gas passage portion may rapidly progress. It is difficult for the aforementioned technology to stabilize the contact resistance of the contact portion while improving the corrosion resistance of the gas passage.

SUMMARY OF THE INVENTION

It is an object of the invention to provide a separator for the fuel cell for stabilizing the contact resistance of a contact portion of the separator without degrading the corrosion resistance of the gas passage portion.

A separator for a fuel cell includes a metal plate having a gas passage portion and a contact portion in a part other than the gas passage portion. The contact portion is brought into contact with a terminal of a cell voltage monitor attached to the fuel cell. A surface treatment applied to the gas passage portion is different from a surface treatment applied to the contact portion. According to the invention, the surface treatment applied to the gas passage portion of the separator is different from the surface treatment applied to the contact portion of the separator in contact with the terminal of the cell voltage monitor. That is, the gas passage portion is applied with the surface treatment for improving the corrosion resistance, and the contact portion is applied with the surface treatment for reducing and stabilizing the contact resistance for maintaining good corrosion resistance of the gas passage portion yet stabilizing the contact resistance of the contact portion. This makes it possible to stabilize the contact resistance of the contact portion and to improve the corrosion resistance of the gas passage portion easily. The surface treatment applied to the gas passage portion includes a carbon coat, and the surface treatment applied to the contact portion includes no carbon coat. This makes it possible to maintain good corrosion resistance of the gas passage portion yet stabilizing the contact resistance of the contact portion. Therefore it is possible to stabilize the contact resistance of the contact portion and to improve the corrosion resistance of the gas passage portion easily.

DETAILED DESCRIPTION OF PREFERRED EMBODIMENTS

Figure 1:
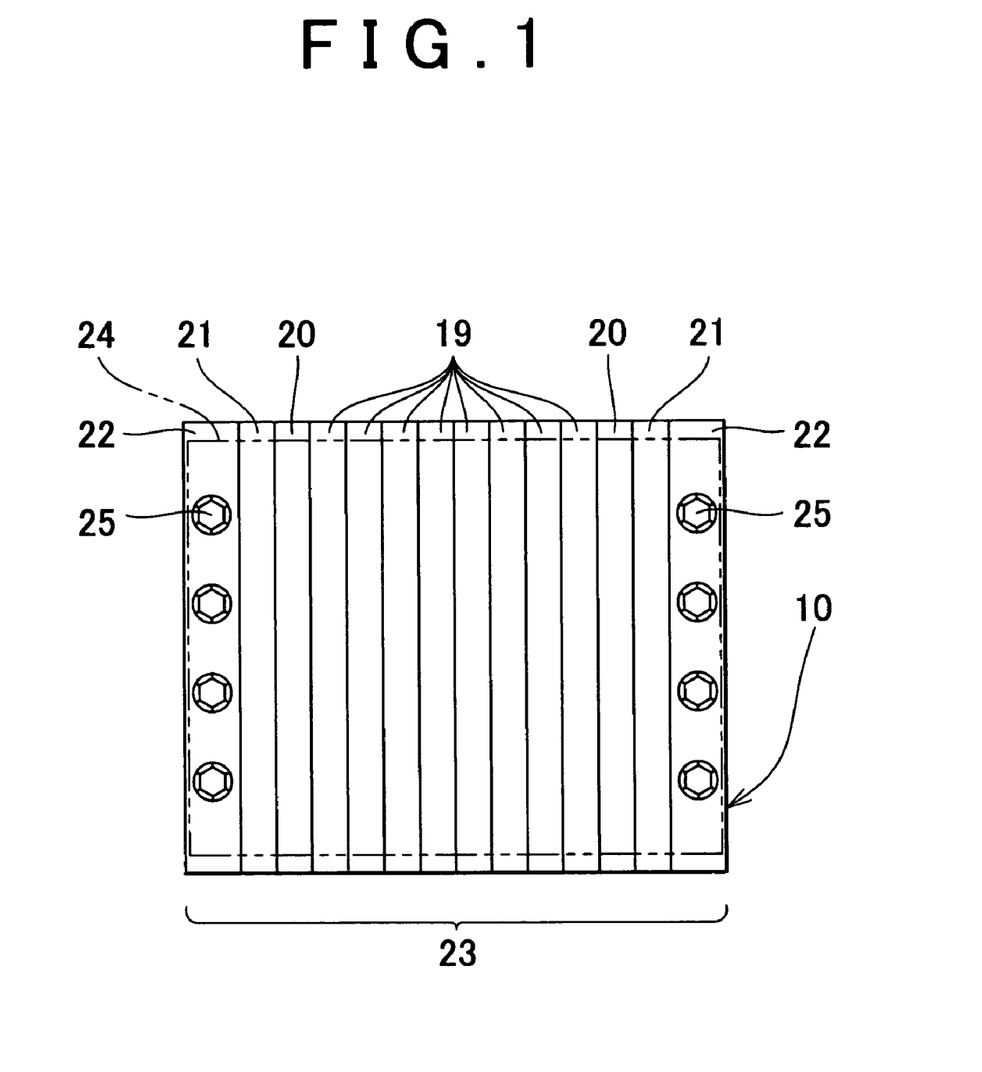
FIG. 1 is a side view of a fuel cell stack when viewed from the direction orthogonal to the stack direction.

A separator for a fuel cell according to the invention will be described referring to FIGS. 1 to 8. The fuel cell herein refers to a low temperature type fuel cell, for example, a polymer electrolyte fuel cell (PEFC) 10 as shown in FIG. 1. The fuel cell 10 may be mounted on a fuel cell electric vehicle. However, it may be available for the use other than the vehicle.

Figure 2:
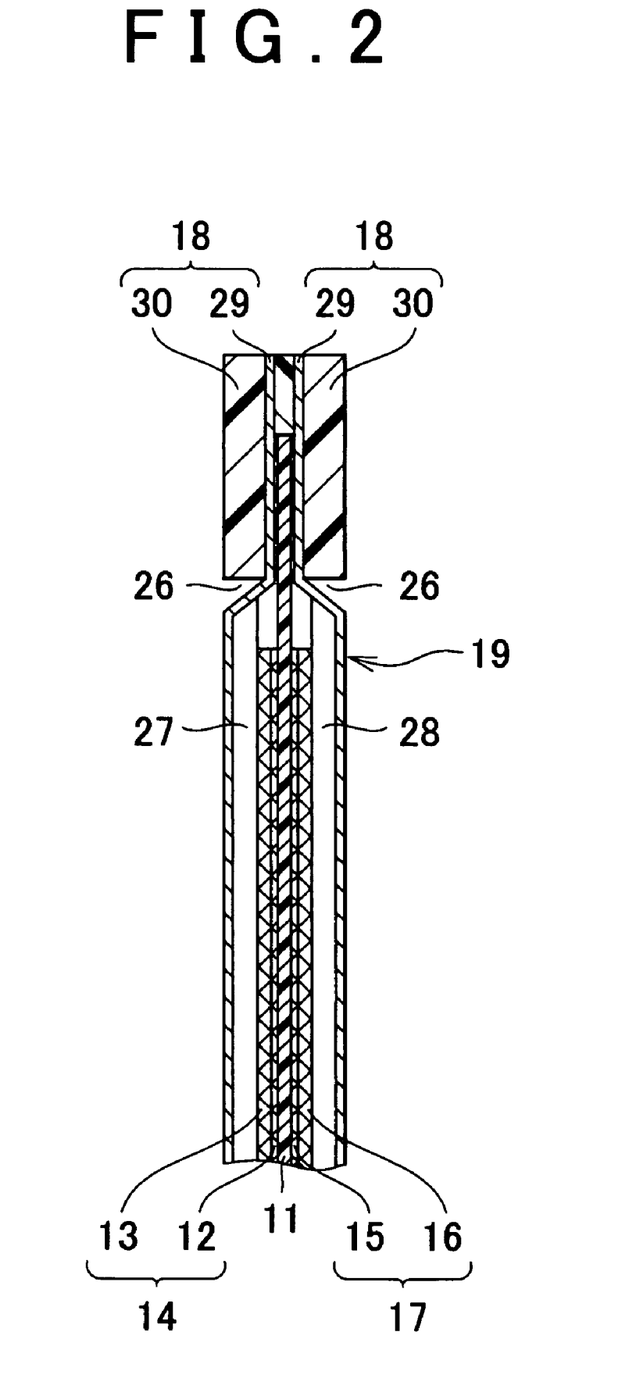
FIG. 2 is a sectional view showing a part of a single cell of the fuel cell stack.

The PEFC 10 is a stack body of an MEA (Membrane-Electrode Assembly) and separators 18 as shown in FIGS. 1 and 2. The MEA includes an electrolyte membrane 11 as an ion-exchange membrane, an electrode or an anode (fuel electrode) 14 as a catalytic layer 12 formed on one surface of the electrolyte membrane 11, and an electrode or a cathode (air electrode) 17 as a catalytic layer 15 formed on the other surface of the electrolyte membrane 11. Diffusion layers 13, 16 are provided between the MEA and the separators 18 at the anode side and the cathode side, respectively. The thus structured MEA and the separators 18 are stacked to form a cell 19. At least one cell is used to form a module. Then a plurality of modules are stacked to form a fuel cell stack. Terminals 20, insulators 21, and end plates 22 are provided at both ends of the fuel cell stack in a stack direction thereof. Then the fuel cell stack is tightened and fixed in the stack direction from outside with a fastening member (tension plate 24) extending in the stack direction as well as a bolt/nut 25 so as to form a fuel cell stack 23.

Figure 3:
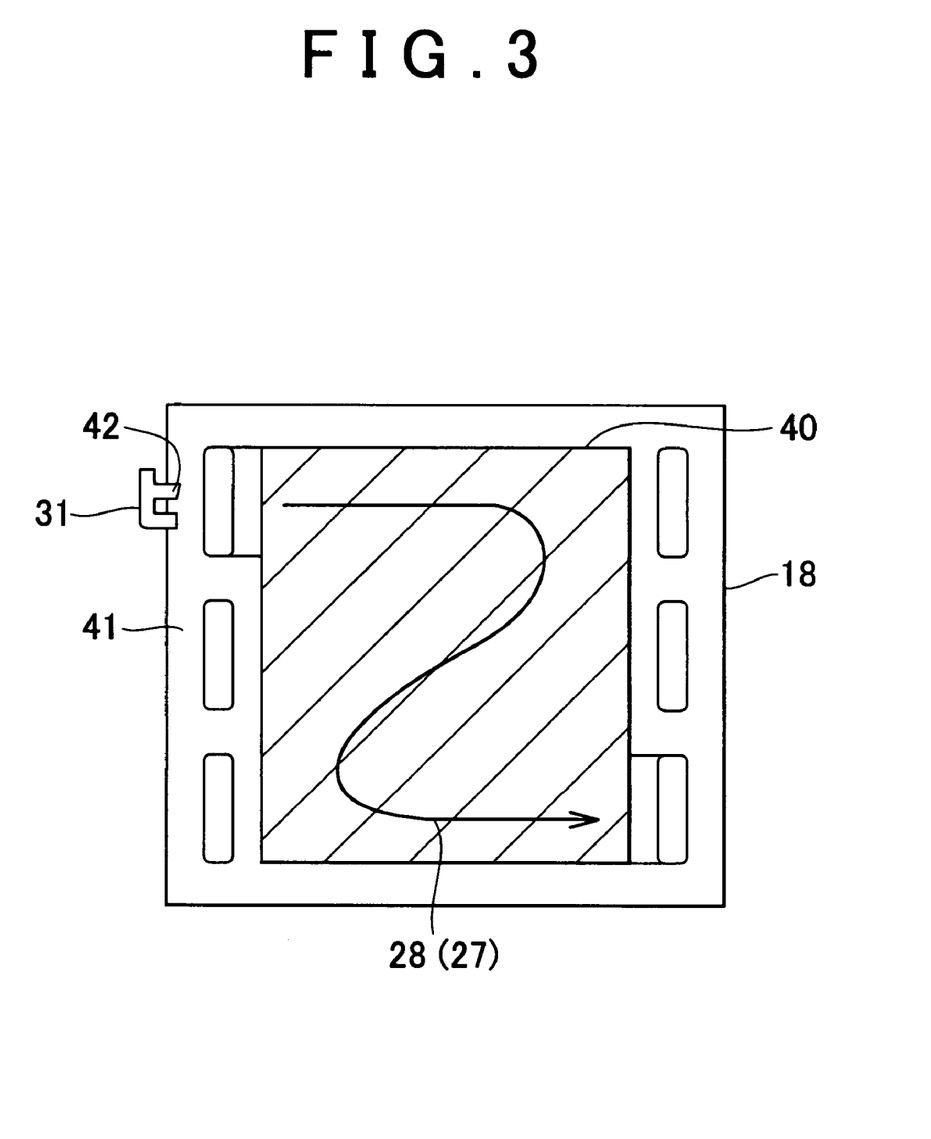
FIG. 3 is a front view of the separator of the fuel cell according to the invention.

The separator 18 has a fuel gas passage 27 for supplying fuel gas (hydrogen) to the anode 14, and an oxide gas passage 28 for supplying the oxide gas (oxygen, that is, air) to the cathode 17. The separator 18 further has a refrigerant passage 26 for supplying a refrigerant (normally cooling water). The refrigerant passage 26 is provided for each cell or each group of cells (by module). The separator 18 is formed as a composite type including a metal plate 29 and a resin frame 30. Referring to FIG. 3, the metal plate 29 includes a gas passage portion 40 in the center of the cell surface and an outer portion 41 other than the gas passage portion 40. The gas passage portion 40 has gas passages 27, 28 formed therein. In the gas passage portion 40, one surface of the metal plate 29 is brought into contact with one of the fuel gas and the oxide gas, and the other surface is brought into contact with the cooling water or the other gas. A periphery of the gas passage portion 40 is sealed with an adhesive agent or a sealing agent. The outer portion 41 other than the gas passage portion 40 is formed outside the inner edge of the sealed portion. The outer portion 41 except a gas manifold is not brought into contact with the fuel gas nor the oxide gas. The resin frame 30 is provided as an outer peripheral surface of the cell.

The MEA is interposed between the metal plates 29 at the positive and the negative sides. The gas passages 27, 28 are formed between the MEA and the metal plates in the center of the surface of the cell, respectively. The electrolyte membrane 11 is interposed between the metal plates 29 at the positive and the negative sides at the peripheral side. Each of the portions between the metal plates 29, the resin frame 30 and the metal plate 29, and the metal plate 29 and the electrolyte membrane 11 is sealed with the adhesive agent serving as the sealing agent. There is a potential difference (approximately 1 volt) between the metal plates 29 at the positive and the negative sides opposite with respect to the electrolyte membrane 11. There is no potential difference between the metal plate 29 at the positive side of one cell 19 and the metal plate 29 at the negative side of the adjacent cell 19 which are in contact with each other in the center of the surface of the cell.

Figure 4:
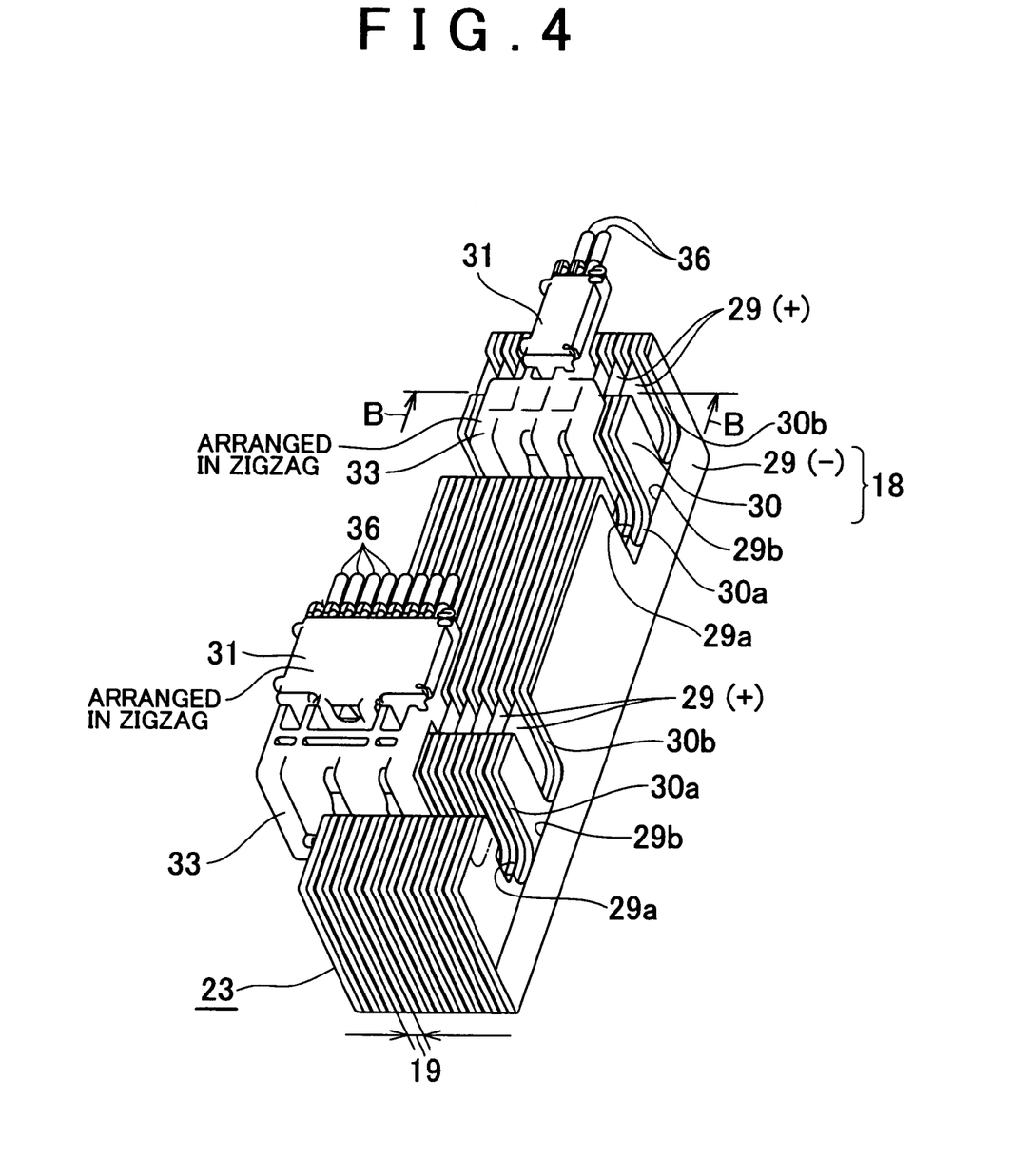
FIG. 4 is a perspective view of a cell voltage monitor attached to the stack assembled with the separator of the fuel cell according to the invention.

As shown in FIG. 4, a plurality of cell voltage monitors 31 are attached to the fuel cell stack 23. The cell voltage monitor 31 includes a housing 33 having a fixture 35 by which the cell voltage monitor 31 is attached to the fuel cell stack 23, and at least one terminal 32 held by the housing 33. The terminal 32 is an electrically conductive member that is formed of a metal or a metal plating. The housing 33 is not an electrically conductive member that is formed of, for example, a resin material. The terminals 32 of the cell voltage monitor 31 are arranged in parallel with one another in the housing 33 in the stack direction of the fuel cell stack 23. A group of a plurality of housings 33 provided for each of the cell voltage monitors 31 is provided on one of four side surfaces of the fuel cell stack 23. The number of electrodes of the cell voltage monitor 31 is equal to that of the terminals 32 held by the housings 33 of the cell voltage monitor 31. FIG. 4 represents two types of the cell voltage monitors 31, one having 2 electrodes and the other having 8 electrodes, each attached to the fuel cell stack 23.

The respective terminals 32 of each of the cell voltage monitor 31 is in contact with the metal plate 29 having the same polarity as that of the electrode of the cell 19 for detecting the potential of the cell 19. When one of the terminals 32 is brought into contact with the metal plate 29 at the positive side of one of the cells 19, the adjacent terminal 32 is brought into contact with the metal plate 29 at the positive side of the adjacent cell 19. Accordingly there is a pitch interval equivalent to the thickness of at least one cell between the adjacent terminals 32. This makes it possible to arrange a plurality of terminals 32 in the stack direction of the fuel cell stack without causing the interference between those terminals 32 in the respective housings 33. Each of partitions 33j of the housing 33 is disposed between the adjacent terminals 32 so as to prevent those terminals 32 from being in contact with each other to cause short-circuit.

Figure 6:
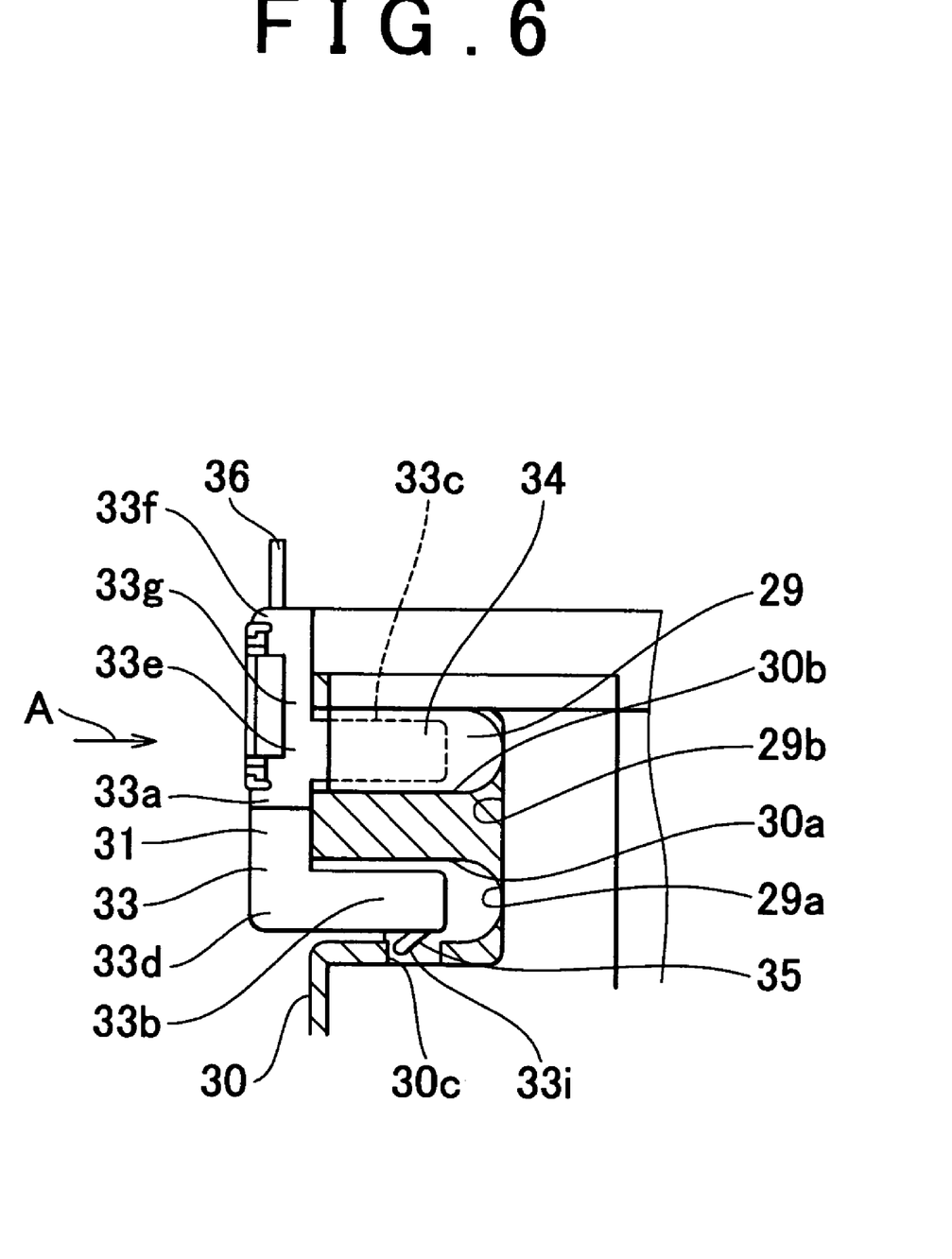
FIG. 6 is a side view of the portion where the cell voltage monitor is attached to the stack as shown in FIG. 4.
Figure 7:
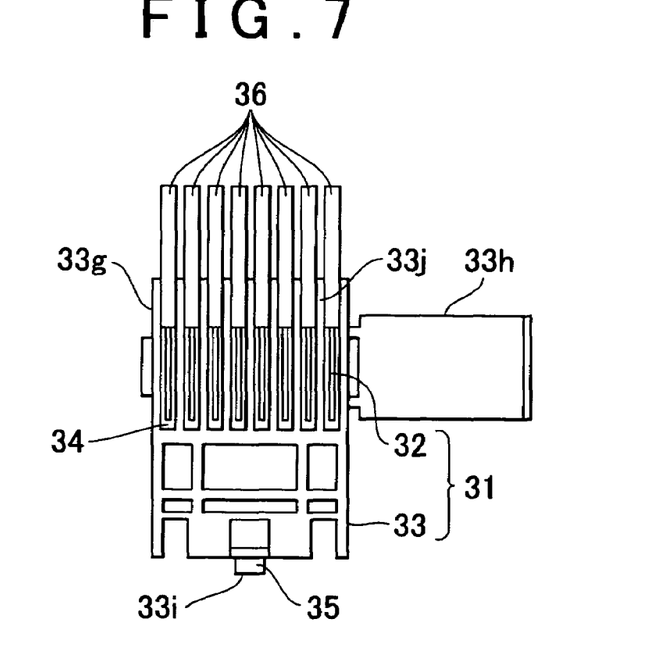
FIG. 7 is a view of the portion shown in FIG. 6 when viewed from the direction A.

Referring to FIG. 6, a contact portion 34 is formed in the terminal 32 of the cell voltage monitor 31 so as to correspond to the metal plate 29. A fixture 35 is formed in the housing 33 of the cell voltage monitor 31 so as to correspond to the resin frame 30. The contact portion 34 is formed separately from the fixture 35.

A contact portion 42 in contact with the terminal 32 of the cell voltage monitor 31 is formed in the outer portion 41 of the metal plate 29 of the separator 18. The contact portion 34 formed in the terminal 32 is in contact with the contact portion 42 formed in the metal plate 29. The contact portion 42 is brought into contact with the contact portion 4. Different types of surface treatment is applied to the metal plate 29 of the separator 18, that is, the surface treatment applied to the gas passage portion 40 is different from the one applied to the contact portion 42 in contact with the terminal 32 of the cell voltage monitor 31. The surface treatment applied to the gas passage portion 40 includes carbon coat. The surface treatment applied to the contact portion 42 in contact with the terminal of the cell voltage monitor does not include the carbon coat.

The metal plate 29 is formed of a stainless steel, having its surface applied with a conductive metal plating, for example, gold plating. If the pinhole is formed in the plated surface, corrosion of the stainless steel plate is likely to progress. So the carbon coat is applied to the surface of the gas passage portion 40 expected to progress the corrosion, especially, the area in contact with the gas by filling the pinhole with the carbon power or the carbon particle. As a result, the corrosion resistance may be improved. No carbon coat is applied to the surface of the gas passage portion 40 in contact with the cooling water as it is not exposed to oxygen. The carbon coat does not have to be applied to the surface of the gas passage portion 40 in contact with hydrogen as the fuel gas. The carbon coat, however, may be applied to the aforementioned surface in contact with hydrogen.

If the carbon coat is further applied to the outer portion 41 of the metal plate 29, especially the contact portion 42 in contact with the terminal 32 of the cell voltage monitor 31, the electric resistance of the contact between the contact portion 42 and the terminal 32 becomes or tends to become unstable. Accordingly, no carbon coat is applied to the contact portion 42. The carbon coat, however, may be applied to the surface of the outer portion 41 other than the contact portion 42. In the case where the stainless steel plate is directly applied with the conductive metal plating, for example, gold plating, the terminal 32 of the cell voltage monitor 31 is directly in contact with the conductive metal plating or gold plating. The surface that is not required to be applied with the carbon coat may be masked during carbon coating so as not to apply the carbon coat to the masked portion.

The cell voltage monitor 31 is attached to the fuel cell stack 23 as described below. Referring to FIGS. 4 to 8, a first groove 30a and a second groove 30b are formed in the resin frame 30 of the fuel cell stack 23 to which the cell voltage monitor 31 is attached. The first groove 30a is separately formed in parallel with the second groove 30b. The terminal 32 is brought into contact with one of the metal plate 29 at the positive side and the metal plate 29 at the negative side. The metal plate 29 in contact with the terminal 32 has a narrow groove 29a with the position and configuration corresponding only to the first groove 30a of the resin frame 30. The metal plate 29 not in contact with the terminal 32 has a wide groove 29b across the first and the second grooves 30a, 30b.

Figure 8:
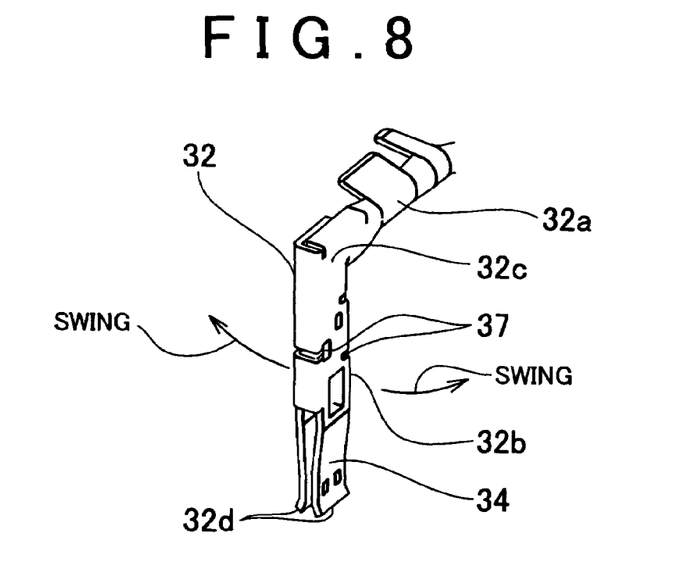
FIG. 8 is a perspective view showing only a terminal of the cell voltage monitor as shown in FIG. 6.

The terminal 32 connected to a cable 36 is a member having an L-like shape as a side view including a first leg portion 32a, a second leg portion 32b, and a bent portion 32c. More specifically, the terminal 32 is connected to the cable 36 at the first leg portion 32a by caulking. The second leg portion 32b of the terminal 32 has a pair of arm portions 32d at its end opposite to the bent portion 32c. The metal plate 29 is interposed between the pair of arms 32d so as to form a contact portion (electric contact portion) 34 in contact with the metal plate 29.

Figure 5:
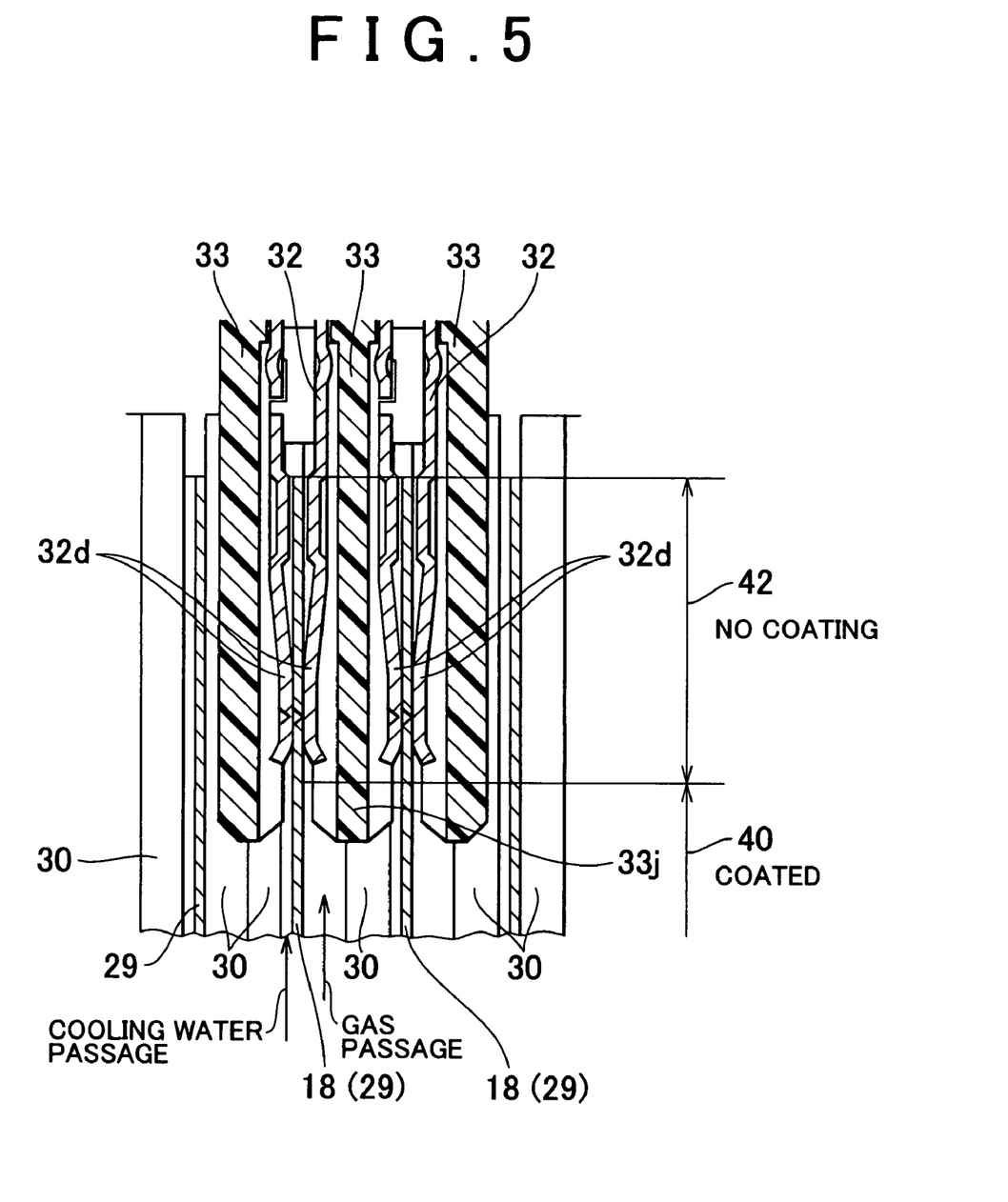
FIG. 5 is a sectional view taken along line B-B of FIG. 4.

The housing 33 has an F-like shape as a side view including an F-shaped column portion 33a, a first leg portion 33b extending from an end 33d of the column portion 33a orthogonal thereto, and a second leg portion 33c extending from an intermediate portion 33e of the column portion 33a orthogonal thereto. In the case where the cell voltage monitor 31 is attached to the fuel cell stack 23, the first leg portion 33b of the housing 33 is fit with the first groove 30a of the resin frame 30 and the groove 29a of the metal plate 29. The second leg portion 33c of the housing 33 is fit with the second groove 30b of the resin frame 30 and the groove 29b of the metal plate 29.

A portion of the column 33a of the housing 33 defined by an end portion 33f opposite to the end portion 33d and the intermediate portion 33e, and the second leg portion 33c constitute a terminal holding portion 33g that holds the terminal 32. After inserting the terminal 32 into the terminal holding portion 33g, a lid 33h of the housing 33 is closed such that the terminal 32 is not fallen off from the terminal holding portion 33g. A protrusion 33i is formed in the surface of the first leg portion 33b of the housing 33 opposite to the surface facing the second leg portion 33c. The protrusion 33i is inserted in a recess portion 30c that is formed in the first groove 30a of the resin frame 30 for receiving the protrusion 33i so as to be engaged with the recess portion 30c. The protrusion 33i and the recess portion 30c constitute the fixture portion 35 that functions in fixing the cell voltage monitor to the fuel cell stack. The edge portion of the grooves 29a, 29b of the metal plate 29, opposite to the first leg portion 33b of the housing 33, is apart from the first leg portion 33b farther than the edge portion of the first groove 30a of the resin frame 30, opposite to the first leg portion 33b of the housing 33.

Accordingly, this makes it possible to allow the protrusion 33i to be engaged with the recess portion 30 with no interference.

Referring to FIG. 8, the terminal has a slit 37 formed between the arms 32d and the bent portion 32c so as to allow an elastic movement of the first leg portion 32a with respect to the pair of arms 32d in the stack direction. Therefore the terminal 32 may be attached by the elastic movement in spite of the error in the dimension of the cell in the thickness direction. As the number of the cells increases, the dimensional error becomes too large to absorb such error. Accordingly, it is preferable to limit the number of the terminals 32 to be held by the single housing 33 to 10 or less.

Referring to FIG. 4, the housings 33 are arranged in the right side and the left side alternately in the stack direction of the fuel cell stack 23. Each cell of the fuel cell stack 23 has a fixture portion for attaching the cell voltage monitor 31 either at the right side or the left side of the fuel cell stack 23. The fixture portion is formed of the first groove 30a, the second groove 30b, the recess portion 30c of the resin frame 30, and two grooves 29a, 29b of the metal plate 29. The fixture portion, thus, is formed not only at the side where the housing 33 is attached, but also at the side where the housing 33 is not attached. In other words, there are two fixture portions formed in the cell for attaching the cell voltage monitor 31 both at the right side and left side of the fuel cell stack. This makes it possible to prepare only one type of the cell for attaching the cell voltage monitor rather than preparing two types of the cell each having the different structure for attaching the cell voltage monitor at its left side and right side of the fuel cell stack.

The function of the separator of the fuel cell according to the invention will be described. The surface treatment applied to the metal plate 29 of the separator 18 is made different between the gas passage portion 40 and the contact portion 42 in contact with the terminal of the cell voltage monitor. That is, the gas passage portion 40 is applied with the surface treatment for improving the corrosion resistance, and the contact portion 42 is applied with the surface treatment for reducing the contact resistance so as to be stabilized. This makes it possible to maintain good corrosion resistance of the gas passage portion 40 while stabilizing the contact resistance of the contact portion 42. This allows the contact portion 42 to have stabilized contact resistance while allowing the gas passage portion 40 to improve the corrosion resistance easily.

More specifically, the surface treatment applied to the gas passage portion 40 of the metal plate 29 of the separator 18 includes the carbon coat. Meanwhile, the surface treatment applied to the contact portion 42 includes no carbon coat. Therefore, the corrosion resistance of the gas passage portion 40 can be effectively maintained while stabilizing the contact resistance of the contact portion 42. This makes it possible to stabilize the contact resistance of the contact portion 42 and to improve the corrosion resistance of the gas passage portion 40 easily. The metal plate 29 for the separator 18 is formed by applying gold plating to the surface of the gas passage portion of, for example, the stainless steel plate. The gas passage portion 40, especially, the one having the oxide gas passage 28 formed therein, is likely to be oxidized as it is brought into contact with the resultant water and oxygen. A pinhole in the gold plated surface may progress the corrosion of the base portion of the stainless steel. Therefore, the pinhole is filled by applying the carbon coat so as to improve the corrosion resistance. The carbon coat may interfere with stabilizing the contact resistance of the contact portion 42 of the metal plate 29 owing to the resultant rough surface. This may degrade the accuracy in the detected potential. According to the invention, the contact portion 42 of the metal plate 29 is not applied with the carbon coat, maintaining the conductive metal plating, especially, gold plating. This makes it possible to stabilize the contact resistance of the contact portion 42 while improving the accuracy of the detected potential.

According to the invention, the surface treatment applied to the gas passage portion of the separator is different from the surface treatment applied to the contact portion of the separator in contact with the terminal of the cell voltage monitor. That is, the gas passage portion is applied with the surface treatment for improving the corrosion resistance, and the contact portion is applied with the surface treatment for reducing and stabilizing the contact resistance for maintaining good corrosion resistance of the gas passage portion yet stabilizing the contact resistance of the contact portion. This makes it possible to stabilize the contact resistance of the contact portion and to improve the corrosion resistance of the gas passage portion easily. In the invention, the surface treatment applied to the gas passage portion includes the carbon coat. Meanwhile, the surface treatment applied to the contact portion includes no carbon coat. This makes it possible to maintain good corrosion resistance of the gas passage portion yet stabilizing the contact resistance of the contact portion. It is possible to stabilize the contact resistance of the contact portion and to improve the corrosion resistance of the gas passage portion easily.

What is claimed is:

1. An apparatus comprising:
   a separator for a fuel cell comprising a metal plate including a coated gas passage portion and a non-coated contact portion, the non-coated contact portion being located further to the side of a periphery of the metal plate than the gas passage portion, a conductive surface of the contact portion being exposed, and
   a terminal of a cell voltage monitor,
   wherein the exposed conductive surface of the contact portion contacts the terminal, and
   wherein an anti-corrosion surface treatment on the gas passage portion includes a metal plating and a carbon coat formed on the metal plating, and an anti-corrosion surface treatment on the contact portion is the metal plating being brought into contact with the terminal of the cell voltage monitor so that contact resistance of the contact portion and the corrosion resistance of the gas passage portion are stabilized; and
   a frame portion, wherein an attachment portion that functions in attaching the cell voltage monitor to the fuel cell is formed in the frame portion and the metal plate,
   wherein the anti-corrosion surface treatment applied to the contact portion comprises no carbon coat,
   wherein first and second grooves are formed in the frame portion and the first groove is separately formed in parallel with the second groove,
   wherein the metal plate comprises a positive side metal plate and a negative side metal plate,
   one of the positive side metal plate and the negative side metal plate has a groove with a position and configuration corresponding to only the first groove,
   the other of the positive side metal plate and the negative side metal plate has a groove across the first and second grooves, and
   the terminal of the cell voltage monitor is brought into contact with the non-coated portionof the positive side metal plate and the negative side metal plate.

2. The apparatus according to claim 1, wherein the attachment portion is engaged with the cell voltage monitor so as to be attached to the fuel cell in a direction where a plurality of cells are stacked into the fuel cell.

3. The apparatus according to claim 1, wherein the metal plate comprises a stainless steel plate applied with a conductive metal plating.

4. The apparatus according to claim 1, wherein the anti-corrosion surface treatment covers the entire gas-passage portion of the metal plate.

5. The apparatus for a fuel cell according to claim 1, wherein a gas passage of the gas-passage portion is formed as part of the metal plate.

6. The apparatus of claim 1, wherein the contact portion includes a conductive metal plating layer formed by the anti-corrosion surface treatment and does not include a carbon coating.

7. The apparatus according to claim 1, wherein
   the metal plate further includes a gas manifold portion located outside the gas passage portion and proximate to a corner of the separator,
   the cell voltage monitor and the portion being located proximate to the corner of the separator,
   both the anti-corrosion surface treatment applied to the gas portion and an anti-corrsion surface treatment applied to the gas manifold portion include the metal plating and the carbon coat formed on the metal plating, and
   the terminal of the cell voltage monitor contacts the metal plating directly, by the contact portion being masked during carbon coating.

8. The apparatus according to claim 7, wherein the contact portion is provided on an edge of the separator that extends in a longitudinal direction of a rectangular gas manifold opening.

9. The apparatus according to claim 1 wherein housings are alternately arranged in right and left sides in the stack direction of the fuel cell, each cell of the fuel cell having a fixture portion for attaching the cell voltage monitor.

* * * * *

UNITED STATES PATENT AND TRADEMARK OFFICE
CERTIFICATE OF CORRECTION

PATENT NO. : 7,459,228 B2
APPLICATION NO. : 10/629764
DATED : December 2, 2008
INVENTOR(S) : Akira Aoto It is certified that error appears in the above-identified patent and that said Letters Patent is hereby corrected as shown below:

| Column | Line | |
|---|---|---|
| 8 | 10 | Change "portionof the positive side" to --portion of the one of the positive--. |
| 8 | 34 | Change "the portion" to --the contact portion--. |
| 8 | 36 | After "gas" insert --passage--. |
| 8 | 37 | Change "anti-corrsion" to --anti-corrosion--. |

Signed and Sealed this

Twenty-eighth Day of July, 2009

JOHN DOLL
*Acting Director of the United States Patent and Trademark Office*